Sept. 1, 1953 E. HOOPER 2,650,806
DOUGH MIXER WITH HOOK ATTACHMENT
Filed Nov. 15, 1951

Inventor
Edward Hooper
By
Alexander [illegible]
Attorneys

Patented Sept. 1, 1953

2,650,806

UNITED STATES PATENT OFFICE 2,650,806

DOUGH MIXER WITH HOOK ATTACHMENT

Edward Hooper, South Shields, England

Application November 15, 1951, Serial No. 256,478
In Great Britain September 26, 1950

2 Claims. (Cl. 259—88)

This invention consists in an improved dough hook for mixing dough for use with food mixing machines of the kind comprising a rotatable bowl and a swinging arm from which depends a dolly spindle on which is removably mounted a dolly for co-operating with the bowl to effect mixing.

The object of the invention is to provide a simple and inexpensive dough mixing and kneading device for attachment in such mixing machines, which will enable such mixing and kneading to be carried out at a relatively higher speed than hitherto, for example, the mixing bowl may be rotated at its normal speed without-overloading the motor and at the same time give a thoroughly homogeneous mixing and kneading of the dough.

According to the invention the dough hook comprises a vertical stem adapted to be rigidly attached to the swinging arm of the mixing machine, and at the lower end of the said stem a radial arm in the form of a hook which at first is downwardly inclined and at its outer end is curved upwards substantially in accordance with the outline of the bowl.

Preferably the vertical stem is hollow and is adapted to pass over the existing dolly spindle of the swinging arm of the machine, means being provided for maintaining the hook rigid with the said horizontal arm. The hook may conveniently be maintained rigid with the arm by forming in the horizontal arm a recess which engages the upwardly bent end of a horizontal arm projecting from the upper end of the hook spindle so that when the latter is in position the bent end engages the recess.

The invention will now be described by way of example with reference to the accompanying drawings which show a preferred form which gives a thorough mixing and kneading without over-loading the motor.

Figure 1:
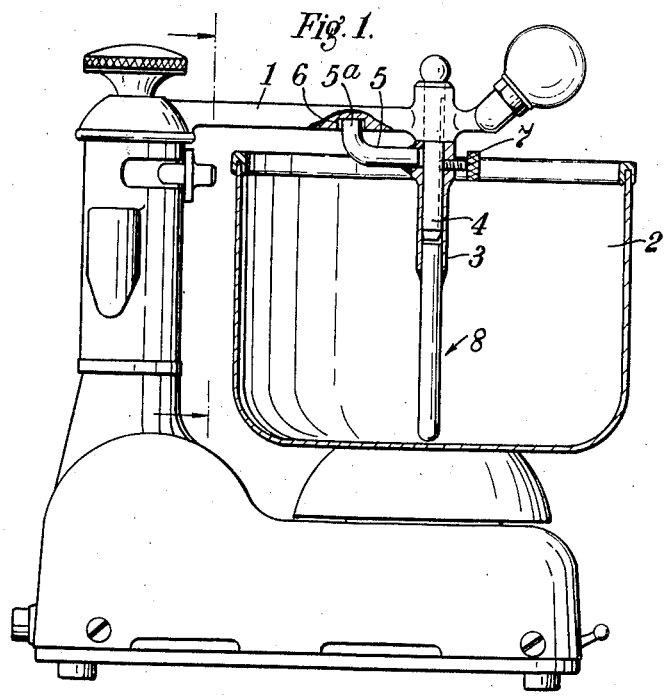
Fig. 1 is an elevation partly in section showing the device fitted to the swinging arm of the mixing machine.
Figure 2:
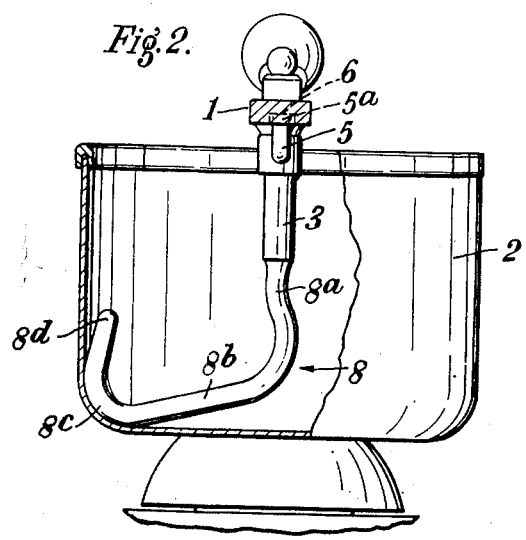
Fig. 2 is a view similar to Fig. 1 but viewed at right angles.

Referring more particularly to the drawings, 1 is the swinging arm and 2 the mixing bowl. The upper portion of the dough hook spindle comprises a sleeve 3 which is adapted to pass over the existing dolly spindle 4, the upper end of the sleeve 3 being enlarged to receive on the one side a laterally projecting arm 5 having its outer end bent upwards at 5a to engage in a recess 6 in a boss formed near the outer end of the horizontal swinging arm 1. Diametrically opposite the arm 5 in the sleeve 3 there is a threaded bore for receiving the clamping screw 7 for clamping the sleeve 3 to the spindle 4. The lower end of the sleeve 3 is reduced in diameter to receive a dough hook proper 8 which is welded to it in a position substantially at right angles to the bent arm 5.

The dough hook proper 8 as it extends downwards curves slightly to the one side of its axis at 8a and then doubles back into a gradual incline 8b to the horizontal until it is near the outer portion of the bowl 2 where it curves back at 8c on a relatively small radius of over 90° from whence it is extended upwards at a small angle as at 8d to the wall of the bowl. The above small radius curve is concentric with that of the lower portion of the bowl 2 and is such that a small clearance of about $\frac{1}{32}''$ is left between the hook 8 and the wall of the bowl 2.

The effect of forming the radial arm 8b downwardly inclined is to cause the major portion of the kneading and folding to take place about the outer end of the hook where owing to its proximity to the wall of the bowl such action is most thorough.

When dough mixing and kneading is to be effected the bowl should be heated by immersing it into boiling water prior to putting in the dough mix. The effect of this is that the dough mix itself indicates that it has been thoroughly kneaded, for after about 2 or 3 minutes the mixture leaves the wall of the bowl and tends to concentrate inwards. When this occurs the dough will be found to be thoroughly mixed and kneaded and ready for rising.

By using a dough hook having a radial arm only instead of a diametrical arm, effective mixing and kneading may be carried out without any tendency of over-load on the part of the motor.

I claim:

1. In a food mixing machine of the kind referred to having a swinging arm overlying a rotatable bowl having a bottom and having side walls; a dough hook attachment comprising a vertical stem adapted to be rigidly attached to the swinging arm, said stem having at its lower end a radial extension in the form of a hook terminating adjacent the bottom of the bowl, which extension at its outer end is curved upwards substantially in accordance with the wall of the bowl; a spindle carried by said swinging arm; the vertical stem of the dough hook being hollow and adapted to pass over the spindle; means for holding the stem on the spindle; and means for maintaining the hook from rotation relatively to said spindle.

2. In a food mixing machine of the kind referred to having a swinging arm overlying a rotatable bowl having a bottom and having side walls; a dough hook attachment comprising a vertical stem adapted to be rigidly attached to the swinging arm, said stem having at its lower end a radial extension in the form of a hook terminating adjacent the bottom of the bowl, which extension at its outer end is curved upwards substantially in accordance with the wall of the bowl; a spindle carried by said swinging arm; and the vertical stem of the dough hook being hollow and adapted to pass over the spindle; means for holding the stem on the spindle; a horizontal arm projecting from the upper end of the sleeve, said horizontal arm being upwardly bent at its outer end; said swinging arm being recessed to receive said bent end when the dough hook is in position on said spindle.

EDWARD HOOPER.

References Cited in the file of this patent

UNITED STATES PATENTS

| Number | Name | Date |
| --- | --- | --- |
| 826,200 | Stronger | July 17, 1906 |
| 843,136 | Dicks | Feb. 5, 1907 |
| 1,765,638 | Trynoski | June 24, 1930 |
| 2,039,277 | Baehr | May 5, 1936 |

FOREIGN PATENTS

| Number | Country | Date |
| --- | --- | --- |
| 419,640 | France | Jan. 11, 1911 |